No. 714,333.  
F. G. SAYLOR.  
VEHICLE TIRE AND RIM.  
(Application filed Aug. 22, 1902.)  
Patented Nov. 25, 1902.

(No Model.)  
3 Sheets—Sheet 1.

Witnesses:  
Aluie Tarr  
Oscar F. Hill

Inventor:  
Franklin G. Saylor  
by Wm. A. Copeland  
Attorney.

No. 714,333. Patented Nov. 25, 1902.
F. G. SAYLOR.
VEHICLE TIRE AND RIM.
(Application filed Aug. 22, 1902.)
(No Model.) 3 Sheets—Sheet 2.
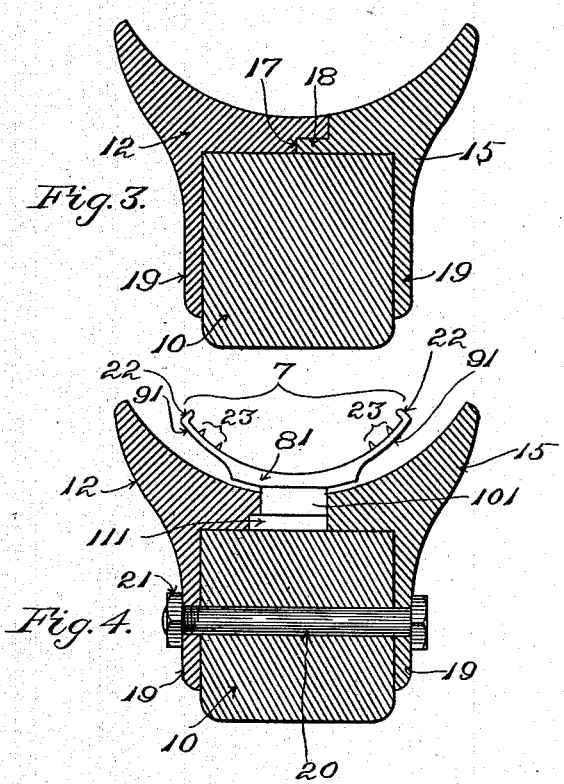
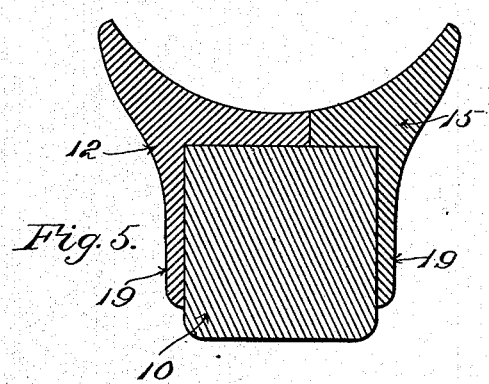
Witnesses:
Oscar F. Hill
Aluie Tarr
Inventor:
Franklin G. Saylor
by Wm. A. Copeland
Attorney.

No. 714,333. Patented Nov. 25, 1902.
F. G. SAYLOR.
VEHICLE TIRE AND RIM.
(Application filed Aug. 22, 1902.)
(No Model.) 3 Sheets—Sheet 3.

Witnesses:
Oscar F. Hill
Aluie Tarr

Inventor:
Franklin G. Saylor
by Wm. A. Copeland
Attorney.

UNITED STATES PATENT OFFICE.

FRANKLIN G. SAYLOR, OF FRANKLIN, MASSACHUSETTS, ASSIGNOR OF ONE-HALF TO GEORGE H. MORRILL, JR., OF NORWOOD, MASSACHUSETTS.

VEHICLE TIRE AND RIM.

SPECIFICATION forming part of Letters Patent No. 714,333, dated November 25, 1902.

Application filed August 22, 1902. Serial No. 120,647. (No model.)

*To all whom it may concern:*

Be it known that I, FRANKLIN G. SAYLOR, of Franklin, in the county of Norfolk and State of Massachusetts, have invented certain new and useful Improvements in Vehicle Tires and Rims, of which the following is a specification.

With the use of rubber tires as commonly made, whether the tire is pneumatic or is made of tubing or is solid, especially when employed on heavy vehicles, there is considerable vibration of the vehicle, which is not only annoying to the rider, but jars the suspended parts of the machine and make frequent repairs necessary.

The object of this invention is to produce a tire which shall be both strong and resilient and shall avoid the above-mentioned objections.

The main feature of the invention consists in a tire having a core wholly or in part of fibrous material other than rubber and surrounded by rubber.

Other features will be set forth in the specification.

Preferably the fibrous core is in form of a rope, but not necessarily so, and the core may or may not have rubber or other material combined with it. Preferably the rubber on the outer or tread portion is thicker than on the inner or rim side.

The invention will now be fully described by reference to the accompanying drawings and the novel features thereof will be particularly pointed out in the claims at the close of the specification.

Figure 8:
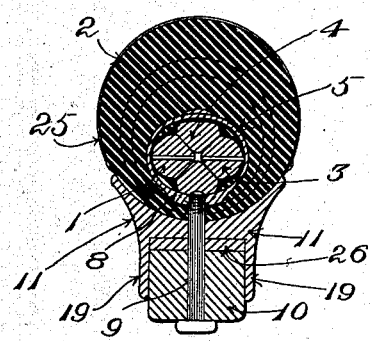
Figure 9:
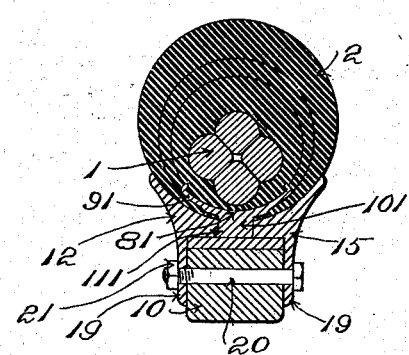
Figure 1:
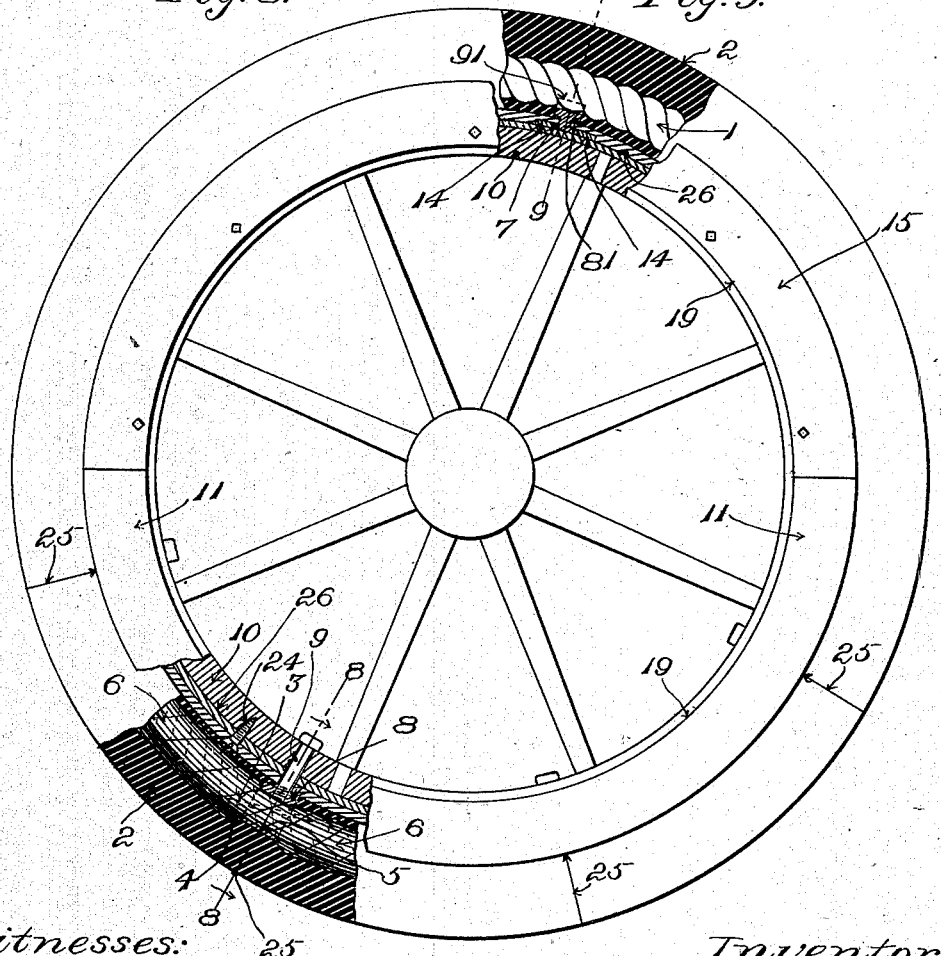
Figure 6:
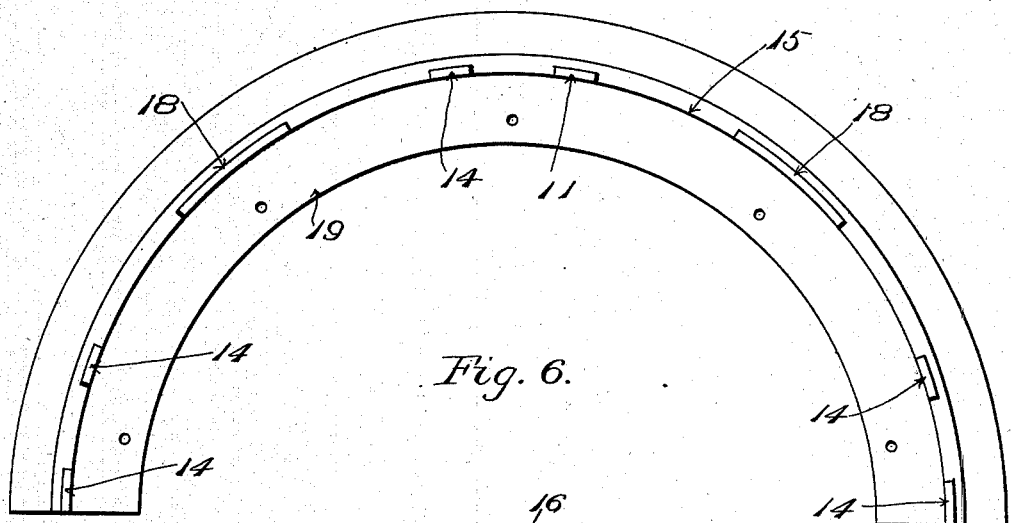
Figure 7:
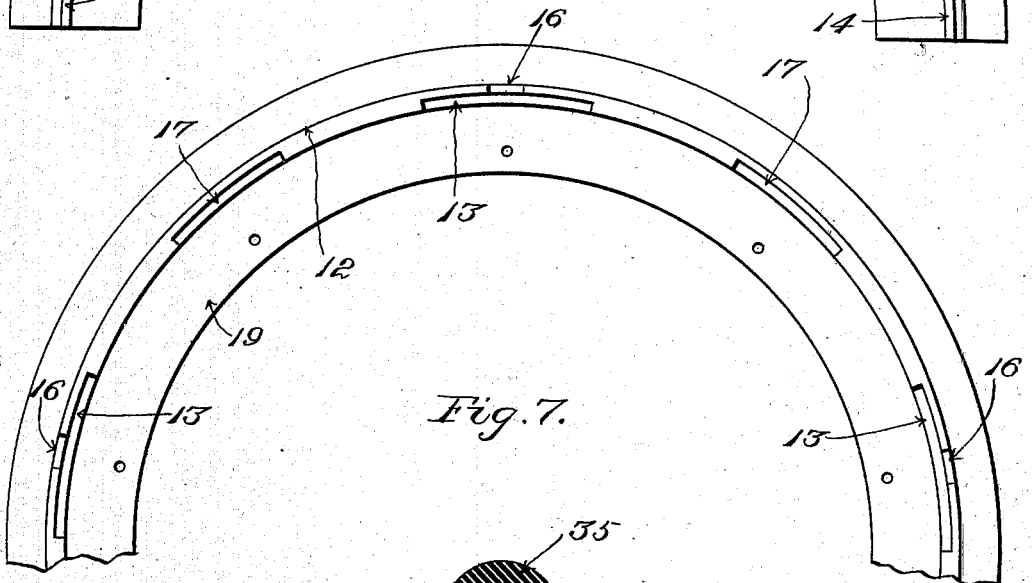
Figure 10:
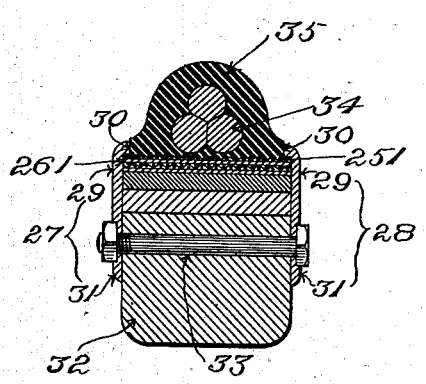

In the drawings, Figure 1 is an elevation, partly in section, of a wheel, illustrating the invention. Fig. 2 is a view of one-half of the channel for the tire, showing all the parts in the same plane and the two members separated. Fig. 3 is an enlarged section on line 3 3 of Fig. 2. Fig. 4 is an enlarged section on line 4 4 of Fig. 2. Fig. 5 is an enlarged section on line 5 5 of Fig. 2. Fig. 6 is an elevation showing the inner side of the removable member of the channel. Fig. 7 is an elevation showing the inner side of that half of the fixed member which engages with the removable member. Fig. 8 is a section on line 8 8 of Fig. 1. Fig. 9 is a section on line 9 9 of Fig. 1. Fig. 10 is a view similar to Figs. 8 and 9 of a modification.

Referring now to the drawings, 1 represents the core of fibrous material, and 2 the rubber outside of the core.

In carrying out the invention in the best form of construction now known to me a fibrous rope of the desired thickness and material is placed upon a stretching device. After being thoroughly dried by a moderate heat and while it is still in the stretching device the ends are tightly wrapped with friction-cloth or other suitable wrapping for a short distance back from the ends to keep them from raveling. The desired length is then marked upon it, and it is cut at the ends by a mitering-machine to a length slightly shorter than the length required of the finished core—say one-fourth to one-half an inch. The beveled ends are then covered with plastic rubber to the required thickness to make the core of the requisite length when the ends are brought together. A sufficient portion of the friction-cloth is allowed to remain to keep the ends in shape, the superfluous portion being removed. The beveled ends 3 4 are brought together and a clamp 5 is placed around the rope at the joint, drawn tight, and its edges secured together by soldering or otherwise. Friction-cloth 6 is then wound around the core, starting at some distance from the joint and continuing around and beyond the clamp and covering the clamp. If desired, the wrapping may be continued the entire length of the core after having placed the other clamps in position. Other clamps 5 should be employed in addition to the one surrounding the joint for the purpose of preventing creeping of the core in the rubber walls and also to aid in securing the tire to the wheel, as will be hereinafter described. The core is then partially built up with plastic rubber and the buttons 7 are placed in position between friction-cloth or canvas, the construction and purpose of which will be more particularly described hereinafter. The core is then covered or built up with plastic rubber to the required thickness to fit the mold, and it is then vulcanized.

I do not intend to be limited to the particular method of putting the rubber around the core, nor to the method of joining the ends to complete the circle, nor do I intend to be limited to a core in the form of a twisted rope. It may be woven or otherwise formed.

The purpose of the clamps 5 previously mentioned is in part to aid in securing the tire to the wheel and in part to prevent creeping of the core inside the rubber. The clamps are made with a split lengthwise to enable them to be placed in position on the core. Then the edges are drawn together to tightly clamp the core and are soldered or otherwise firmly joined together to prevent the clamp from springing open. The side 8 of the clamp, which is toward the channel or rim, should preferably be of greater thickness than is necessary for the rest of the clamp in order to hold the bolts 9. Through this thickened portion of the clamp is formed a threaded bolt-hole. The bolt 9 passes through the felly 10 and through the intermediate parts to and through the clamp 5 and should be long enough for its end to bear against the core 1. These clamps and bolts should be placed at intervals suitable to firmly hold the tire.

When the tire is used on heavy vehicles, if the channel for the tire is all in one piece and is put on entire before the rubber tire is put on it is difficult to stretch the tire sufficiently to put it over the flange of the channel. In order to obviate this difficulty, I prefer to make the channel for one half of the circumference sectioned lengthwise—that is, to have one flange of the channel for half of the periphery removable to enable the tire to be put into position by first inserting the tire into the channel on, say, the lower half of the wheel, then the removable flange being off of the upper half of the channel the upper half of the tire can be easily slipped onto its seat in the fixed part of the channel by putting it on from the side from which the flange has been removed. Then the removable flange is inserted and secured in position.

For convenience of description the portion of the channel which is divided will be referred to as the "upper" half and the undivided portion as the "lower" half, because when the tire is being attached to the wheel it is more convenient to have the wheel held fixed in that position. In the device shown in the drawings to illustrate this feature of the invention 11 represents the lower half of the channel, which is much like the upper half, except that it is in one piece. The upper half of the channel may be divided lengthwise on any suitable lines and any suitable means may be employed to secure the two members together and to secure the tire to the channel.

The form of construction of the two members of the upper half of the channel and the means of attaching the tire to the channel, which are the best now known to me, are shown in the drawings and are thus described.

The buttons 7 previously referred to by means of which the tire is secured to the channel are formed with a base 81, having wings 91, which when the tire is built up are inclosed in the rubber between canvas or friction-cloth to firmly hold the buttons in place. A shank 101 connects the base 81 with the head 111. Preferably the wings 91 are formed with hook-flanges 22 at their ends and with clips 23 struck up on their inner face to form a friction to more firmly hold the tire.

The two members of the channel are slotted in suitable manner to embrace the shanks of the buttons, so that when the two members are jointed together in position and bolted to the felly after the tire is in place the tire will be firmly held.

In the form of construction of the button shown the head 111 projects beyond the shank on all sides but one.

In the fixed member 12 of the channel, at suitable distances apart corresponding with the buttons, are formed lateral recesses 13 in the under side of the inner face to receive the head of the button and also to receive tongues 14, which project from the removable member 15 of the channel. In the roof of the recess 13 is formed a slot or opening 16 to receive the shank 101 of the button. Between the recesses 13 are formed other recesses 17 in the fixed member to receive corresponding tongues 18 on the removable member.

Each member of the channel is formed with a downwardly-extending flange 19, one of which extends down on each side of the felly. These flanges are secured to the felly and to each other by bolts 20, thus firmly securing the two members of the channel to the wheel and to each other and binding the tire to the channel. The bolts are clamped by nuts 21, so that the bolts may be withdrawn to remove the separable member of the channel when desired.

For additional means of securing the channel and felly together screws 24 may be used, which have their heads countersunk in the channel and pass through it and through the steel tire 26 into the felly.

For the purpose of enabling the ready finding of the clamps 5, so as to know where to bore in for insertion of the bolts 9, beaded lines 25 are preferably molded in the tire.

The modification shown in Fig. 10 is specially intended for use with light-weight vehicles. In this construction 34 represents the fibrous core and 35 the rubber, which, as shown, is molded in somewhat different form from that shown in Figs. 8 and 9. The inner periphery—that is, the side which comes in contact with the face of the channel—is built of alternate layers of canvas or metal 251 and rubber 261, which form a flanged extension at the sides. The fixed member 27 and the removable member 28 are each formed with an upwardly-extending flange 29 and an inwardly-extending lip 30, which engage the flanged extensions of the tire just described to hold the tire in position. The two members 27 and 28 are formed with downwardly-extending flanges 31, which embrace the felly 32 and are clamped to the felly by bolts 33.

While I have described the best method now known to me of building the tire with the fibrous core and rubber outside, I do not intend to limit myself to the particular method described nor to the particular form of channel. The removable member may be secured in any suitable way. Nor do I intend to limit myself to the use of a channel having a removable member, as it may be possible to spring the tire into place on a non-separable channel.

What I claim is—

1. A vehicle-tire having a fibrous core, clamps upon said core and an outer covering of rubber vulcanized around said core and clamps, substantially as described.

2. A vehicle-tire having a fibrous core, clamps surrounding said core, an outer covering of rubber surrounding said core and clamps and vulcanized, said clamps having bolt-holes through which bolts may extend to secure the tire to the wheel, substantially as described.

3. A vehicle-tire having a core of fibrous material, an outer covering of rubber, and clamps which bind the core and the rubber together, substantially as described.

4. A vehicle-tire having a core of fibrous material, an outer covering of rubber, clamps which engage the core and are anchored in the rubber, screw-holes in one side of the clamps, and screw-bolts which pass from the outside through the wall of rubber and through the clamps and impinge on the core, substantially as described.

5. A vehicle-tire having a core of fibrous material, an outer covering of rubber, clamps which engage the core and are anchored in the rubber and screw-holes in one side of the clamps, in combination with a channel for the tire, and screw-bolts which pass through the channel, through the wall of rubber and through the clamps and impinge on the core, substantially as described.

6. A vehicle-tire having an outer covering of rubber and a device for securing the tire to a wheel consisting of a base having wings embedded in the tire, canvas in the tire on both faces of the wings, a shank which projects from the said base out through the tire, and a flanged head on the outer end of the shank, substantially as described.

7. A vehicle-tire having an outer covering of rubber, and a device for securing the tire to a wheel, consisting of a base having wings embedded in the tire, a shank which projects from the said base out through the tire, and a flanged head on the outer end of the shank, substantially as described.

8. A vehicle-tire having a core formed of a rope of fibrous material whose ends are cemented together by rubber, a clamp around said joint, a canvas wrapping around said clamp and around the core for some distance each side of the clamp, and an outer covering of rubber, substantially as described.

9. A vehicle-tire having a core formed of a rope of fibrous material whose ends are cemented together by rubber, a wrapping of canvas around the joint of said ends, and an outer covering of rubber, substantially as described.

10. A channel for a vehicle-tire formed for at least a portion of its periphery of two members, one fixed and one removable, each member containing one of the flanges of the channel and means for securing the removable member to the fixed member, in combination with a vehicle-tire composed in part at least of rubber, and devices for attaching the tire to the channel, each of said devices having an anchor which is embedded in the rubber and having a projecting shank and head, said channel members being formed with slots through which the shanks extend and with recesses to receive the heads, substantially as described.

In testimony whereof I have affixed my signature in presence of two witnesses.

FRANKLIN G. SAYLOR.

Witnesses:
WILLIAM A. COPELAND,
ROBERT WALLACE.